(12) United States Patent
Billock et al.

(10) Patent No.: US 7,743,169 B1
(45) Date of Patent: Jun. 22, 2010

(54) MULTI-PHASE DETECTION ALGORITHM

(75) Inventors: Joseph Gregory Billock, Glendale, CA (US); Kanianthra Mani Chandy, Le Canada, CA (US); Lee Forestt Rosen, Alameda, CA (US)

(73) Assignee: Avaya, Inc., Basking Ridge, NJ (US)

( * ) Notice: Subject to any disclaimer, the term of this patent is extended or adjusted under 35 U.S.C. 154(b) by 2324 days.

(21) Appl. No.: 10/222,388

(22) Filed: Aug. 16, 2002

Related U.S. Application Data (60) Provisional application No. 60/326,487, filed on Oct. 1, 2001.

(51) Int. Cl.
G06F 15/16 (2006.01)
(52) U.S. Cl. .............................. 709/250; 705/6; 702/189
(58) Field of Classification Search .................. 709/250; 705/6; 702/189
See application file for complete search history.

(56) References Cited

U.S. PATENT DOCUMENTS 5,640,597 A * 6/1997 Noguchi et al. ............... 710/21
6,609,085 B1 * 8/2003 Uemura et al. .............. 702/189
2002/0165810 A1 * 11/2002 Evertsz et al. ................. 705/36

* cited by examiner

*Primary Examiner*—Hassan Phillips
*Assistant Examiner*—Glenford Madamba
(74) *Attorney, Agent, or Firm*—Douglas Grover (57) ABSTRACT

A method for processing data in the form of a stream of messages regarding, for example, stock price information, implemented using a computer system wherein the data may arrive at a rate faster than the computer system can process individual messages. Each message is tagged with a phase number as it arrives; only the data in the messages received at the end of a phase are stored in the computer system's database. Periodically, at the end of at least one phase and perhaps at the end of many phases depending on the rate messages are received, the computer queries its database to select information regarding the data. Algorithms, according to the present invention, allow the efficient selection of data by disregarding a portion of the information in some cases, and, in other cases, by finding the phase ranges wherein data messages overlap between phase ranges. In the former, data is lost; it the latter, data processing may be slowed. The selected information is then output.

21 Claims, 3 Drawing Sheets

MULTI-PHASE DETECTION ALGORITHM

CROSS-REFERENCE TO RELATED APPLICATIONS

This invention describes a method for performing efficient queries on a data repository where the elements in the repository are tagged with phase numbers. The invention is generally related to the process identified as phased match detection with variable concurrent input described in U.S. provisional patent application 60/326,487, filed Oct. 1, 2001.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Rapid growth in the amount of information available on the Internet has contributed to a growing demand for a technique of processing data. For example, a computer user could be interested in gathering information from the Web that corresponds to specific criteria set by a potential buyer, such as information describing automobiles for sale or airline flights provided at discount, making a list of the information gathered and selecting specific items from the list that match the buyer's criteria.

Traditional techniques exist for gathering information from the Internet and from other static sources. However, these traditional techniques lack judgment and processing ability. All the matching information is extracted, and no judgments are made by the system as to the usefulness of the information or its applicability to the present circumstances.

Thus, there is a need in the art for an improved technique for evaluating the applicability of information to the various criteria developed by different users.

SUMMARY OF THE INVENTION

According to its major aspects, the present invention is a computer-implemented method by which messages in a data stream can be processed more efficiently, particularly when those messages are arriving at a rate faster than the rate they can normally be processed. The method involves programmable mathematical algorithms that enable a computer programmed to implement those algorithms to tag message data with phase numbers, and then to manage the message data by ignoring a portion of it in the event messages arrive faster than they can otherwise be processed, or by preserving all messages but optimizing the processing of them.

Many features and their advantages of the present invention will be clear to those skilled in data management software from a careful reading of the Detailed Description of Preferred Embodiments, accompanied by the drawings.

DETAILED DESCRIPTION OF PREFERRED EMBODIMENTS

This invention establishes modifications to the process described in a separate application called Phased Match Detection with Variable Concurrent Input. The process described in that application addresses receipt of messages arriving at a variable but manageable rate. The modifications of this invention relate to improvements in the process of this companion invention that deal with the overload capacity of a system; that is, with the receipt of messages at rates that exceed the capability of a system to process individual messages.

The problem of overload capacity can be understood by studying systems that are designed to display current stock prices. If stock prices change faster than the system is able to display them, the system can do one of two things:

Approach 1—The system can display old stock prices until the system catches up and displays the new stock prices.

Approach 2—The system can forgo displaying intermediate price changes until a specific increment has been exceeded, at which time it can display new stock prices.

In case of Approach 1, the entire system is slowed down. For example, at time 10:01 one might see the price of a stock at time 10:00. If the overload situation continues, at time 10:10 one might see the price of the stock at time 10:06. At this point, there is a four-minute delay. This approach displays the current prices like an unfolding film with some of the film shown in slow motion. The advantage of this approach is that all the intermediate prices are displayed after the overload situation abates. The disadvantage is that old, outdated prices are displayed which may no longer be useful, and those using the display will not know this.

In the case of Approach 2, the system is not slowed down, but incremental changes are ignored. The advantage of this approach is that the display of prices is current and real. At time 10:01 the price of the stock at or near 10:01 is displayed, and at time 10:10, the price of the stock at or near 10:10 is displayed. This approach displays the current prices in a sequence of "snapshots." The advantage of this display is that the current stock price is displayed at the appropriate times. The disadvantage is that some transitions of the price are not displayed.

In general, an event-handling system can deal with data overload in one of two ways: (1) all events are buffered in a queue for later handling; and (2) some events are ignored and lost. Buffering all events causes a delay in processing time. Ignoring some events obviously causes a loss of data.

This invention is a method for processing data that includes two computer-implemented algorithms that deal with each situation: "delay data" events and "lose data" events designed for use when messages are arriving at a rate that exceeds the capability of a system to process them; i.e., for providing failure modes. Neither failure mode is ideal. Either one may be preferred based on the application circumstances.

The section below describes the concepts that comprise the phase algorithm described in the application called Phased Match Detection with Variable Concurrent Input. The following section describes the macro-phase algorithm, which loses some events. A third section describes the "delay data" algorithm. The algorithms will be described using stock prices as examples. However, it will be clear that these algorithms apply to a wide variety of types of data.

The Phase Algorithm

Consider a computer system that receives a data feed of stock prices. The system receives and stores in a database a stream of message data where each message is a "tuple" of data, including a timestamp, the stock symbol and the stock price. The data tuple is in the form: (timestamp, stock symbol, price). For example, the tuple (20011228080000, IBM, 120) signifies a timestamp of 8 AM on Dec. 28, 2001 for an IBM stock price of US $120.00.

The computer system may receive requests for data stored in the database. The computer database will generate a "request table" from two columns of data. In this scenario, a trader—call him Joe—uses the system to request information about IBM stock pricing. The request table contains a row with the values "Joe" in the first column (the user ID) and "IBM" in the second column (the stock symbol). The trader wishes to receive a continuous stream of messages containing prices of stocks that the trader, Joe, has requested.

The computer-implemented phase algorithm divides time into intervals called "phases." The phases might not all be of the same duration. The programmed computer stores messages in a database at the start and at the end of each phase. For example, the computer keeps track of the prices of IBM stock at the start of a phase and at the end of the phase, but it does not keep track of price changes during the phase, according to the phase algorithm.

Figure 1:
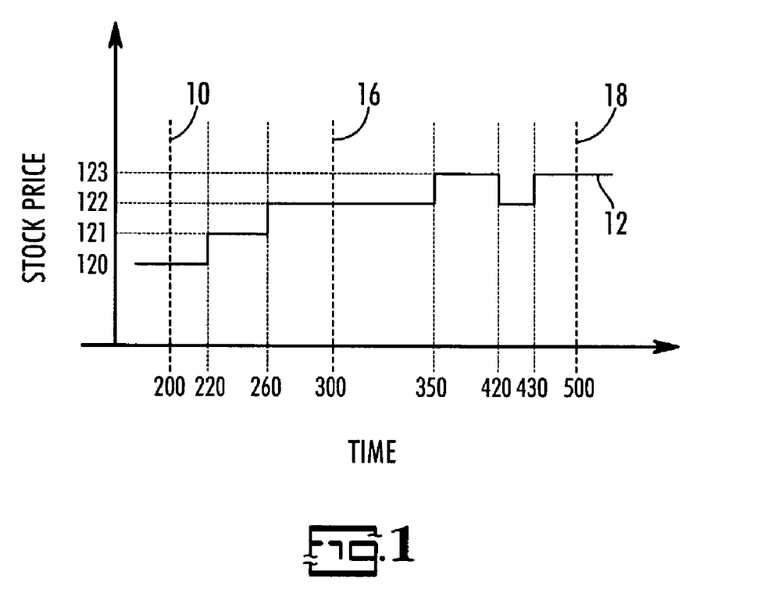
FIG. 1 is a graph illustrating a hypothetical stock price as it changes over time.
Figure 2:
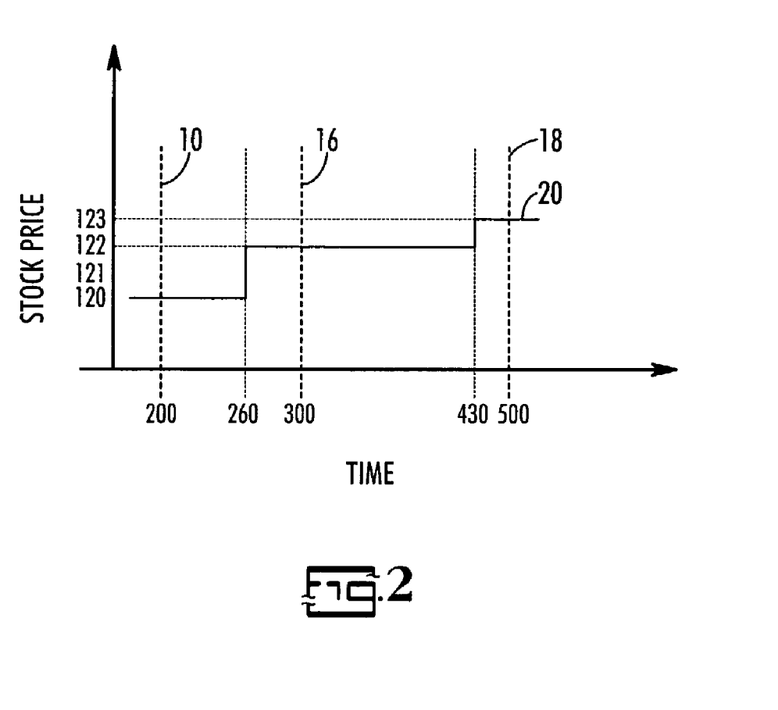
FIG. 2 is a graph illustrating the recorded stock price changes of FIG. 1 using the phase algorithm, according to a preferred embodiment of the present method.

Referring to FIG. 1, beginning at a time 200 in arbitrary units indicated by line 10, a phase change occurs with phase 1 ending and phase 2 beginning. The stock price 12 of IBM stock is shown changing as a function of time. Let's say phase 2 ends and phase 3 starts at time 300, indicated by line 16, and ends when phase 4 begins, as indicated by line 18, when the clock reads 500. Assume that the price of IBM stock when the clock reaches 300 is $122, when it reaches 350 is $123, at 420 is $122, and at 430 is $123, and remains unchanged for the remainder of phase 4. Then, the computer makes a record 20 of the prices, $122 for phase 2 and $123 for phase 3, at the end of each phase but misses the price changes at times 350 and 420. FIGS. 1 and 2 show the actual price 12 and the price record 20 made by the computer, respectively. The difference between the two is the error due to the failure mode in dealing with an overload of data.

The computer thus records at most one change in each phase for a given variable such as IBM stock price in this illustration, namely, the very last change in a phase. For example, in phase 2, IBM price changes at times 220 and 260, but the computer, when programmed with the phase algorithm according to the present method, only records the last change before the end of the phase, and hence it only records the change at time 260.

Messages can be stored in a database and output in tables of the following form.

| Stock Price Table | | | | |
|---|---|---|---|---|
| Start Phase (s) | End Phase (e) | Stock Symbol (b) | Price (p) | Time Stamp (t) |
| 4 | 11 | IBM | 120 | 20011228080000 |
| 11 | 19 | IBM | 121 | 20011228080101 |
| 5 | infinity | BEA | 65 | 20011228080001 |
| 19 | 36 | IBM | 122 | 20011228080203 |
| 36 | infinity | IBM | 121 | 20011228080405 |

A row with start phase s, end phase e, stock symbol b, price p, and timestamp t, has the following meaning. The price for stock b is assumed to remain unchanged at price p from timestamp t in phase s to the beginning of phase e. During phase e, either the price p of stock b changed from p to some other value, or stock b was deleted from the system. Setting e to a value of "infinity" indicates that the system has not recorded any subsequent phase in which stock b has changed in price.

Consider the case where there are two rows in the table with the same stock symbol, as follows. Let the two rows be (s0, e0, b0, p0, t0) and (s1, e1, b1, p1, t1) where b0=b1. Consider the case where s1=e0 as for example, in the first two rows of the table where b0=b1=IBM, and s1=e0=11. This means that the price remained unchanged at value p0 from time t0 in phase s0 to time t1 in phase s1. At time t1 the price changed from p0 to p1.

Consider the first row of this table, with start phase 4, end phase 11, stock symbol IBM, price $120, and timestamp 20011228080000. The price was 120 at time 20011228080000. This fact means that the data element was time-stamped as received during phase 4, and there was a change in the price of IBM from some previous value to 120 at time 20011228080000 that happened to fall in phase 4, and this change in price caused a new row to be inserted in a database stored in the computer with a start phase of 4. The row also tells us that when phase 4 (the start phase) ended, the price was 120. When this row is inserted, the end phase is initially set to a default value such as infinity. An end phase of "infinity" indicates that the value of the variable is unchanged from the timestamp of the row till "now."

A change in price from 120 to something else (121 in this example) in phase 11 causes a modification of the end phase of the first row from infinity to 11, and the entry of a new row with start phase 11. The end phase for this new row is initially set at infinity, just as was done for the previous row. Likewise, it will be changed from infinity to its final value when there is another change in the price.

Selecting the portion of Stock Price Table containing the price and timestamp where stock symbol is "IBM" gives us the price changes recorded for IBM. These price changes are shown in the following table.

| Price Changes for IBM Stock | |
|---|---|
| Price (p) | Timestamp (t) |
| 120 | 20011228080000 |
| 121 | 20011228080101 |

-continued

Price Changes for IBM Stock

| Price (p) | Timestamp (t) |
|---|---|
| 122 | 20011228080203 |
| 121 | 20011228080405 |

Likewise, selecting the price and timestamp where the stock symbol is "BEA" gives us the price changes recorded for BEA—in this case simply a price of $65 at time 20011228080001.

The next table shows the phases in which the IBM stock price changed. This table is the same as the previous one with the phase number added.

Phases in which IBM Stock Price Changed

| Price (p) | Timestamp (t) | Start Phase (s) |
|---|---|---|
| 120 | 20011228080000 | 4 |
| 121 | 20011228080101 | 11 |
| 122 | 20011228080203 | 19 |
| 121 | 20011228080405 | 36 |

In addition to the stock price table, the computer generates a request table to keep track of subscriptions for stock information by traders (requestors). A trader may subscribe for information about a specific stock at any time, and the trader may unsubscribe at any time. The events tracked in the request table are (1) a trader subscribes for a stock or (2) a trader deletes a subscription for a stock.

Request Table

| Start Phase | End Phase | Requestor | Stock | Subscribe? | Time Stamp |
|---|---|---|---|---|---|
| 5 | 18 | Greg | IBM | subscribe | 20011228080100 |
| 6 | infinity | Greg | BEA | subscribe | 20011228080105 |
| 7 | infinity | Eric | IBM | subscribe | 20011228080110 |
| 18 | 26 | Greg | IBM | unsubscribe | 20011228080200 |
| 26 | infinity | Greg | IBM | subscribe | 20011228080300 |

Figure 3:
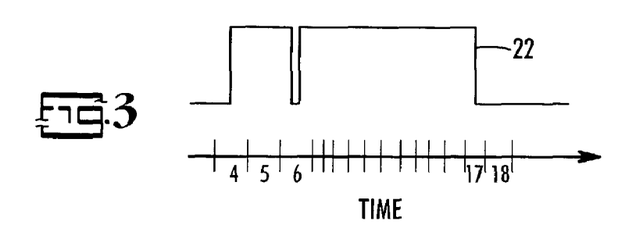
FIG. 3 is a graph illustrating a change in another variable, namely, whether a trader is subscribing for stock price information or unsubscribing, as that variable changes over time.
Figure 4:
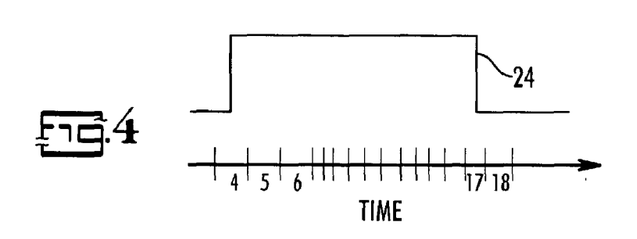
FIG. 4 is a graph illustrating the changes recorded in the subscription variable of FIG. 3 using the phase algorithm, according to the preferred embodiment of the present method.

The algorithm allows the computer to deal with an overload for requests in the same way that it deals with an overload of stock price information. Suppose Greg deletes his subscription for IBM in the middle of phase 6 at time 20011228080110 and immediately reenters his subscription for IBM at time 20011228080115. Since these events happen within phase 6, they will not be recorded, and the system assumes that Greg remains continuously subscribed for IBM for the duration of phase 6. FIGS. 3 and 4 illustrate how subscription events may be lost.

FIG. 3 illustrates a trace 22 versus time of changes from being subscribed to being unsubscribed and then a nearly immediate change back to being subscribed. FIG. 4 illustrates a recorded trace 24 versus time that shows the temporary deletion of the subscription in phase 6 is not recorded by the computer programmed with the present algorithm.

The Macro Phase Algorithm

This section presents the macro phase algorithm, which deals with overload conditions by losing some events which would be generated by the phase algorithm. It operates by combining event detection into a single bulk or macro phase operation.

The phase algorithm is designed to record the final event in a phase. The algorithm loses events other than the last one occurring in the phase. We can control the number of events lost by reducing phase duration. If, however, we make phase sizes arbitrarily small we may have an overload situation with computer unable to process the stream of messages sent to it. If the messages arrive at a rate that cannot be accommodated by the computer, and if current data must be displayed, there is no alternative but to accept errors.

One type of error deals with slopes or derivatives. Suppose a trader wants an alert if a stock price drops by 5% in 10 seconds. Suppose the stock price drops to 5% for 2 seconds in the middle of a 10-second phase and then climbs back up. The phase algorithm will miss the 5% drop and will not give the trader the expected alert.

The motivation for the macro phase algorithm is to deal with this failure mode by using "macro-phases" consisting of many consecutive phases joined together. The original algorithm, as described above, moves forward one phase at a time. The macro-phase algorithm, on the other hand, moves forward a macro-phase at a time. This allows phase sizes to be made smaller so that the computer programmed with this algorithm keeps up with incoming data when it has the capability, and then uses the macro-phase algorithm when overload conditions arise. When the algorithm moves forward by a macro-phase, it loses track of events that occur in phases within the macro-phase in the same way the phase algorithm described above loses track of events occurring within a single phase.

For example, assume that we have detected events up to end of phase 5, and that the current phase is now 61, i.e., events generated currently are entered in phase 61. The original algorithm generates events one phase at a time, i.e., it generates the events in phases 6, then 7, then 8, and so on, all the way up to phase 60 (the phase before the present phase). The macro-phase algorithm joins some of these phases into groups of phases called "macro-phases." For example, the macro-phase algorithm could cause the computer to create two macro-phases: macro-phase I consisting of phases 6 through 40, and macro-phase II consisting of phases 41 through 60. Alternatively, the macro-phase algorithm could create a single macro-phase consisting of phases 6 through 60.

Let a macro-phase start in phase macro_s, and let the next macro-phase start in phase macro_e. In our example, macro-phase I starts in phase 6 and macro-phase II starts in phase 41, so macro_s=6 and macro_e=41 for macro-phase I. Likewise, macro_s=41 and macro_e=61 for macro-phase II.

Figure 5:
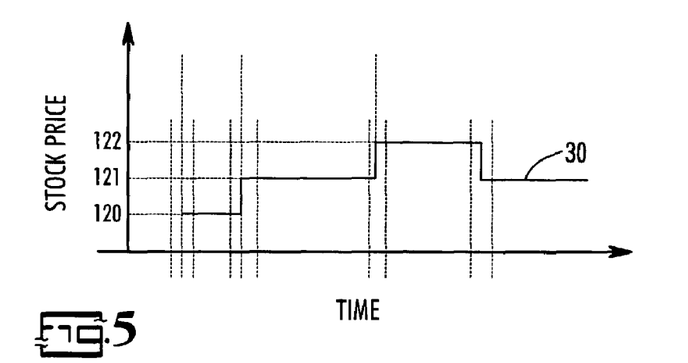
FIG. 5 is a graph illustrating another hypothetical stock price as its phase price changes over time.
Figure 6:
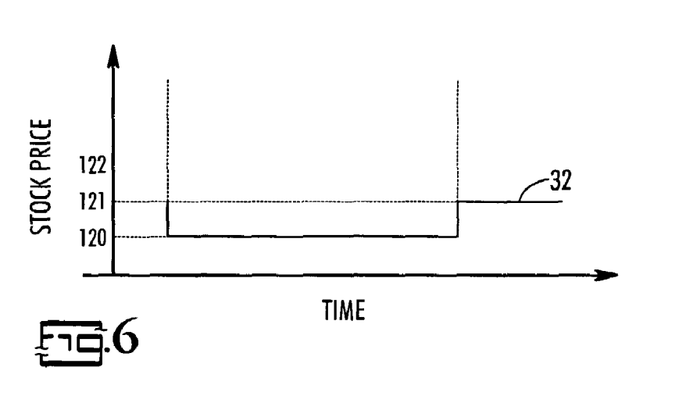
FIG. 6 is a graph illustrating the macro-phase recorded stock price changes of FIG. 5 using the macro-phase algorithm, according to a preferred embodiment of the present method.

FIG. 5 shows the sequence 30 of changes in phase stock price versus time. Phase stock price is the price recorded for each phase, as opposed to actual, instantaneously changing stock prices. FIG. 6 shows the sequence 32 recorded by the macro-phase algorithm that records the last change before the start of macro-phase I at line 40, and the last change before the start of macro-phase II at line 42. Macro-phase I starts in phase 6, and the last change before phase 6 is the drop in price to 120 at time 20011228080000. Likewise, the last change before macro-phase II starts is at time 200112280405, and this change results in a price of 121.

Let us postpone the discussion of how many phases should be joined together to form a macro-phase. All we care about, for the time being, is that some number of consecutive phases (including perhaps a single phase) forms a single macro-phase.

As best seen in FIG. 6, the computer programmed to employ the macro-phase algorithm effectively compares data in a macro-phase to a "snapshot" of the system taken at the beginning of phase macro_s. A snapshot is a capturing or recording of the incoming data into a database at the beginning of phase macro_s. In our example, for macro-phase I, we take a snapshot at the beginning of phase 6, and, for macro-phase II, at the beginning of phase 41.

The next two tables show stock prices and subscription status for our example.

| Stock Price Table | | | | |
|---|---|---|---|---|
| Start Macro-Phase | End Macro-Phase | Stock Symbol | Price | Time Stamp |
| I | II | IBM | 120 | 20011228080000 |
| II | Infinity | IBM | 121 | 20011228080101 |
| I | Infinity | BEA | 65 | 20011228080405 |

Note, the second column in this table, "end macro-phase" is either the starting phase of the next macro-phase or is set at infinity until the third macro phase has begun.

A corresponding request table might look something like the following:

| Request Table | | | | | |
|---|---|---|---|---|---|
| Start Macro-phase | End Macro-phase | Requestor | Stock Symbol | Subscribe? | Time Stamp |
| I | Infinity | Greg | IBM | subscribe | 20011228080100 |
| II | Infinity | Greg | BEA | subscribe | 20011228080105 |
| II | Infinity | Eric | IBM | subscribe | 20011228080110 |

What events should be generated at the start of macro-phase I, assuming that no events were generated earlier? The snapshot at the start of macro-phase I shows the first and third rows of the stock price table, and the first row of the request table. It does not show the second row of the stock price table or the last two rows of the request table because these rows start in macro-phase II.

The "join" of the rows that are snapshots at the start of macro-phase I produces the following event.

| Micro-Phase I Join | | | |
|---|---|---|---|
| Requestor | Stock Symbol | Price | Time Stamp |
| Greg | IBM | 120 | 20011228080000 |

What events should be generated at the start of macro-phase II? In macro-phase II, according to the above tables, we have all three rows of the request table, and the second and third rows of the stock-price table. The join of these rows of these tables produces the following events.

| Micro-Phase II Join | | | |
|---|---|---|---|
| Requestor | Stock Symbol | Price | Time Stamp |
| Greg | IBM | 121 | 20011228080101 |
| Greg | BEA | 65 | 20011228080405 |
| Eric | IBM | 121 | 20011228080101 |

Thus, the macro-phase algorithm is likely to generate fewer events because it only generates events corresponding to the data snapshots at the start of each macro-phase and not at the start of each phase.

Next, let us explore algorithms that generate these events and only these events. The basic algorithm is straightforward, though optimizations can be complex. Let us start with the basic idea.

We want to take a snapshot of all tables at the start of a macro-phase. Consider a row of a table with start phase s and end phase e. For example, in the row of the table below, s=4, and e=11. The macro-phase algorithm takes a snapshot at the end of phase macro_s, i.e., at the end of phase 6.

| Start Phase | End Phase | Stock Symbol | Price | Time Stamp |
|---|---|---|---|---|
| 4 | 11 | IBM | 120 | 20011228080000 |

The snapshot at the start of a macro-phase will "see a row" if and only if the start of a macro-phase is between the start phase and the end phase of a table row; or "s<=macro_s<e." (Recall that macro_s is the phase in which the macro-phase starts.)

Note that the end phase—or "e"—in the above table is the phase in which the next change takes place. For example, in the above row, the change to price 121 at time 20011228080101 occurs in phase 11. The snapshot condition is "s<=macro_s and macro_s<e". We have a strict inequality on the right but not on the left. To understand why, one must first remember that the numbers recorded in s and e refer to the phases in which the changes happened. Since we want to detect changes that happened in the phase labeled macro_s, we need to allow s=macro_s in the condition. Since the algorithm prohibits s=e for any row, e=macro_s must be excluded from the condition by using the strict inequality macro_s<e.

In our example, macro-phase I sees the row (IBM, 120, 20011228080000) because 4<=6<11. Thus, all we need to do to take a "snapshot" of a table T of this form at the start of a macro-phase is to execute the statement:

SELECT*FROM T WHERE T.s<=macro_s<T.e.

Consider our example with macro_s=6 and macro_e=61 with a price of 120 at the end of phase 6 and a price of 121 at the end of phase 61. When our macro-phase algorithm-programmed computer gets to the start of macro-phase II (i.e., to phase 61) it needs to delete the previous event—i.e., the price of 120—and add the current event—i.e., the price of 121. So, it deletes the events in the snapshot it sees in phase 6 and adds events in the snapshot it sees in phase 61. In general, the computer deletes events in the snapshot at the start of a phase-macro, or "macro_s," and adds events in the snapshot at the start of the next phase-macro, or "macro_e."

Thus, when we move the detection up to the start of the next phase-macro, which will be macro_e, the delete events are obtained (using the SQL92 standard querying language to query a compliant database) by:

SELECT*FROM T WHERE T.s<=macro_s<T.e, and the events that are added are obtained by:
SELECT*FROM T WHERE T.s<=macro_e<T.e.

Consider a join across two tables T1 and T2. The delete event condition must apply to both tables. So we get:
(T1.s<=macro_s<T1.e) AND (T2.s<=macro_s<T2.e)

Consider the first clause in both conjuncts:
(T1.s<=macro_s) AND (T2.s<=macro_s).

For many tables, this clause is equivalent to:
max_s<=macro_s where
max_s=max(T1.s, T2.s).

In other words, we are looking for the largest start phase number s in Tables T1 and T2, which we are calling "max_s." Max_s must be less than or equal to the phase number at the start of the macro-phase (macro_s) whose value we are deleting at the start of the next macro-phase.

In general, for a join across an arbitrary number tables, the delete-event condition is:
((max_s<=macro_s) AND (macro_s<min_e))

where
min_e=min(T1.e, T2.e, T3.e, ... ), or the smallest end phase number from among tables T1, T2, T3, etc., and
max_s=max(T1.s, T2.s, T3.s, ... ), the largest start phase number from among tables T1, T2, T3, etc.

Following the same analysis, the corresponding add-event condition is:
((macro_e<min_e) AND (max_s<=macro_e)), which means that the phase number at the start of a macro-phase must be less than the smallest end phase number in any table and larger than or equal to the largest start phase number in any table. For the example using the algorithm in the SQL92 language, the statement that generates both add-events and delete-events is therefore:
SELECT*FROM T1, T2, T3, ... WHERE
(((max_s<=macro_s) AND (macro_s<min_e)) OR
((max_s<=macro_e) AND (macro_e<min_e)))

Optimization

The event obtained by the above join statement starts at time max_s and ends at time min_e.

Consider the case where max_s<=macro_s<macro_e<min_e.

In this case, clauses of both select statements hold, and so we will delete and then add the same events. Deleting and adding the same event is equivalent to doing nothing. An optimization step is to rule out the do-nothing case by adding the clause:
AND NOT (max_s<=macro_s<macro_e<min_e)

The optimization gives:
SELECT*FROM T1, T2, T3, ...
WHERE (((max_s<=macro_s) AND (macro_s<min_e))
OR ((max_s<=macro_e) AND (macro_e<min_e)))
AND NOT (max_s<=macro_s<macro_e<min_e).

The WHERE clause is equivalent to:
(((max_s<=macro_s) AND (macro_s<min_e) AND NOT (macro_e<min_e)) OR
((max_s<=macro_e) AND (macro_e<min_e) AND NOT (max_s<=macro_s))).

Thus the phase algorithm is optimized to use the macro-phase algorithm by a select statement incorporating the equivalent WHERE clause on the tables being queried for events.

Post Processing

The rows in the result set identify either delete-events or add-events. The delete-events delete old events and the add-events add new events. A delete event followed by an add event for an element having the same identifier, or "key," is either a modify-event for that element, or is a null operation. The delete-event and add-event pair is equivalent to a null operation if and only if the value added is identical to the value deleted.

Let us order the result set by element keys of the tables. Each concatenation of keys can appear at most twice in the result set: once for a delete-event and once for an add-event. For a given key, let us order rows by T1.s. (We could choose to order by T2.s, or T3.s.) Suppose we have two values for a given key, and the corresponding T1.s values are 10 and 30. The 10-value must correspond to the delete-event because:
T1.s<=max_s<=macro_s, and the 30-value must correspond to the add-event because:
macro_s<min_s<=T1.s.

So, the following statement generates the result set for post-processing:
SELECT*FROM T1, T2, T3, ... Tk WHERE
((max_s<=macro_s) AND (macro_s<min_e) AND NOT (macro_e<min_e))
OR
((macro_e<min_e) AND (max_s<=macro_e) AND NOT (max_s<=macro_s))
ORDER BY keys, T1.s, where "keys" stands for the primary keys of all the rows of the tables in the join (T1 through Tk).

If the post processing system sees two values for a key, then the first value corresponds to a delete-event and the second to an add-event. If the post processing system sees exactly one value for a key, then the value is a delete event if T1.s<=macro_s, and is an add event if T1.s>macro_s.

The post-processing system remains unchanged as we change the detection algorithm from the existing phase algorithm to the macro-phase algorithm.

Optimization: Expanding Max and Min

Databases have difficulty optimizing maximum and minimum. So, we expand max_s and min_e to get the final formula. The term max_s<=macro_s is equivalent to:
T1.s<=macro_s and T2.s<=macro_s and ... and Tk.s<=macro_s, where k is the number of tables in the join. The term macro_s<min_e is equivalent to:
macro_s<T1.e and macro_s<T2.e and ... macro_s<Tk.e.

With substitutions in the above form, we get the final sequence query language or SQL statement:
SELECT*FROM T1, T2, ..., Tk WHERE
((T1.s<=macro_s and T2.s<=macro_s and ... and Tk.s<=macro_s)
AND
(macro_s<T1.e and macro_s<T2.e and ... and macro_s<Tk.e)
AND NOT
(macro_e<=T1.e and macro_e<=T2.e and ... and macro_e<=Tk.e))

OR
((macro_e<T1.e and macro_e<T2.e and ... and macro_e<Tk.e)
AND
(T1.s<=macro_e and T2.s<=macro_e and ... and Tk.s<=macro_e)
AND NOT
(T1.s<=macro_s and T2.s<=macro_s and ... and Tk.s<=macro_s))
ORDER BY keys, T1.s.

The Bulk Events Algorithm

This section describes the "delay data" variant of the algorithm. The messages arriving contain information about "events." This algorithm deals with an overload condition by detecting all the events for several phases in one step, but not losing any. Since it does not lose any, it still faces the problem of falling behind the message handing system in an overload condition. However, by knowing that it needs to detect events across multiple phases, it can do this multiple detection in an optimized way.

Figure 7:
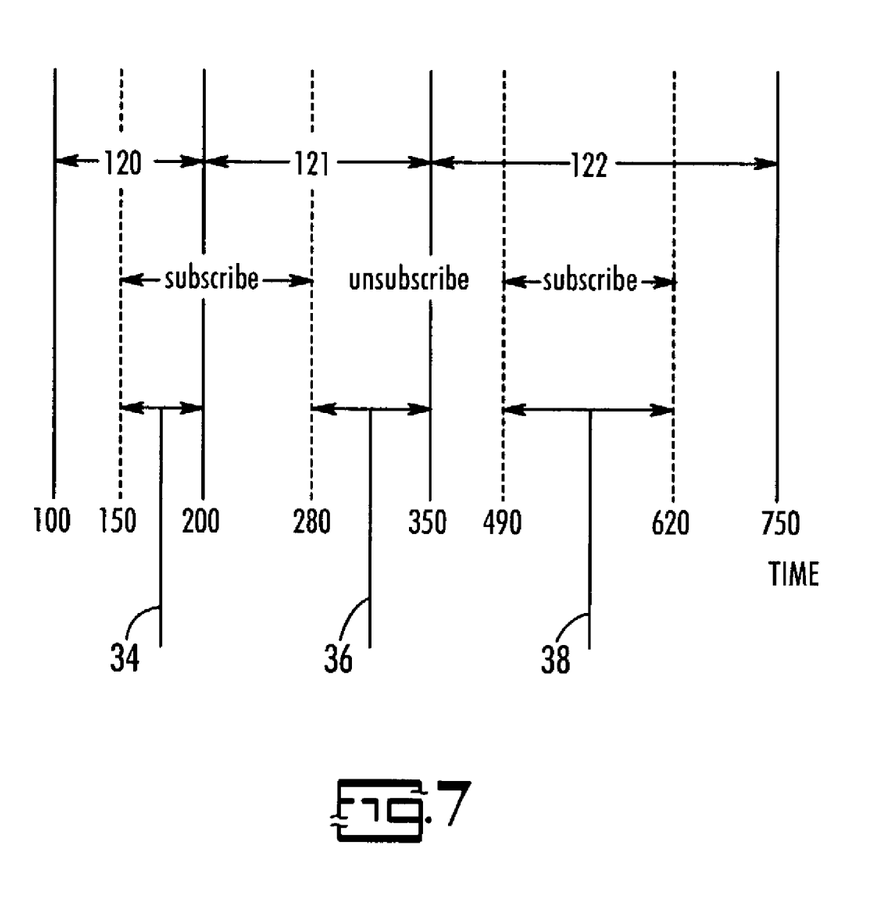
FIG. 7 is a graph illustrating the join across data types, in particular of price changes versus time and subscription orders versus time, according to a preferred embodiment of the present invention.

Consider the same example as before: one stream of messages corresponds to events in the form of changes in IBM's stock price, and the other stream of messages corresponds to events in the form of changes in requestor Greg's subscriptions for IBM stock information. FIG. 7 illustrates this example. FIG. 7 illustrates the join between changes in stock prices and the decision to subscribe and unsubscribe. The price remains unchanged between the continuous vertical lines, and the subscription remains unchanged between dashed vertical lines. The horizontal lines 34, 36, and 38, at the bottom show regions where both price and subscription are unchanged, such as where the price is 120 between times 100 and 200. Greg has no subscription before time 150, and is subscribed from time 150 to time 280. So, IBM stock price is 120 and Greg is subscribed for the interval between time 150 and time 200.

The interval in which both price and subscription remain unchanged is the region where a price-constant interval and a subscription-constant interval overlap. For example, the 120-price interval [100, 200] and the subscribe-interval [150, 280] overlap in the region [150, 200]. Two intervals [s1, e1] and [s2, e2] overlap if and only if: s2<e1.

In general, k intervals, [s1, e1], [s2, e2], ..., [sk, ek] overlap if and only if for all n and m: sn<em. The region of overlap is max(s1, ..., sk) to min(e1, ..., ek). Indeed, another way of checking whether k intervals overlap is determining whether the following formula evaluates to true:

max(s1, ..., sk)<min(e1, ..., ek)

In the notation given earlier, the intervals overlap if and only if max_s<min_e.

Modifying the SQL Join Statement

Our goal is to modify the SELECT statement that the user specifies to take into account the overlapping intervals. In the current phase algorithm, the SQL determines when a new event is added and when an old event is deleted. (The determination of whether consecutive adds and deletes is really a "modify" is done outside the SQL.) In the bulk detection algorithm, an overlapping interval specifies that the event corresponding to the interval is created at the start of the interval and is deleted at the end of the interval. For example, there is a row (120 and subscribe) in the result set for the interval [150, 200]. So, the event (120 and subscribe) is created at time 150, and is deleted at time 200. Likewise, there is a row (121 and subscribe) for the interval [200, 280]. So, this event (121 and subscribe) is created at time 200 and deleted at time 280. The external system determines that the sequence "delete (120 and subscribe)" followed by "insert (121 and subscribe)" is really a modification instruction.

The bulk results for the Stock Price Table and Request Table above are:

| Start Phase | End Phase | Stock | Price | Price Time Stamp | Requestor | Subscribe | Subscribe Time Stamp |
|---|---|---|---|---|---|---|---|
| 5 | 11 | IBM | 120 | 20011228080000 | Greg | Subscribe | 20011228080100 |
| 11 | 18 | IBM | 121 | 20011228080101 | Greg | unsubsc. | 20011228080100 |
| 18 | 19 | IBM | 121 | 20011228080101 | Greg | subsc. | 20011228080200 |
| 19 | 26 | IBM | 122 | 20011228080203 | Greg | subsc. | 20011228080200 |
| 26 | 36 | IBM | 122 | 20011228080203 | Greb | subsc. | 20011228080300 |
| 36 | Infinity | IBM | 121 | 20011228080405 | Greg | subsc. | 20011228080300 |
| 7 | 11 | IBM | 120 | 20011228080000 | Eric | subsc. | 20011228080110 |
| 11 | 19 | IBM | 121 | 20011228080101 | Eric | subse. | 20011228080110 |
| 19 | 36 | IBM | 122 | 20011228080203 | Eric | subsc. | 20011228080110 |
| 36 | Infinity | IBM | 121 | 20011228080405 | Eric | subsc. | 20011228080110 |
| 6 | Infinity | BEA | 65 | 20011228080001 | Greg | subsc. | 20011228080105 |

Consider an example where the bulk start phase is 6 and the bulk end phase is 61 as in the example for the macro-phase algorithm. The next table shows the events generated between the bulk-start and bulk-end phases, i.e., between phases 6 and 61. In this table, the timestamps have been omitted for brevity.

| Add OR Delete | Event Time | Max s | Min e | Stock | Price | Requestor | Subscribe OR unsubscribe |
|---|---|---|---|---|---|---|---|
| Delete | 11 | 5 | 11 | IBM | 120 | Greg | subscribe |
| Add | 11 | 11 | 18 | IBM | 121 | Greg | subscribe |
| Delete | 18 | 11 | 18 | IBM | 121 | Greg | subscribe |
| Add | 18 | 18 | 19 | IBM | 121 | Greg | unsubscr. |
| Delete | 19 | 18 | 19 | IBM | 121 | Greg | unsubscr. |
| Add | 19 | 19 | 26 | IBM | 122 | Greg | unsubscr. |
| Delete | 26 | 19 | 26 | IBM | 122 | Greg | unsubscr. |
| Add | 26 | 26 | 36 | IBM | 122 | Greg | subscribe |
| Delete | 36 | 26 | 36 | IBM | 122 | Greg | subscribe |
| Add | 36 | 36 | Infinity | IBM | 121 | Greg | subscribe |
| Add | 7 | 7 | 11 | IBM | 120 | Eric | subscribe |
| Delete | 11 | 7 | 11 | IBM | 120 | Eric | subscribe |
| Add | 11 | 11 | 19 | IBM | 121 | Eric | subscribe |
| Delete | 19 | 11 | 19 | IBM | 121 | Eric | subscribe |
| Add | 19 | 19 | 36 | IBM | 122 | Eric | subscribe |

-continued

Events Generated Between Bulk Start and Bulk End Phases

| Add OR Delete | Event Time | Max s | Min e | Stock | Price | Requestor | Subscribe OR un-subscribe |
|---|---|---|---|---|---|---|---|
| Delete | 36 | 19 | 36 | IBM | 122 | Eric | subscribe |
| Add | 36 | 36 | Infinity | IBM | 121 | Eric | subscribe |
| Add | 6 | 6 | Infinity | BEA | 65 | Greg | subscribe |

Next, let us explore how to generate these events.

The algorithm should generate add-events for results where:

bulk_start_phase<=max_s<=bulk_end_phase

For example, one bulk phase may have bulk_start_phase=10 and bulk_end_phase=14, and the next bulk phase will have bulk_start_phase=15 and bulk_end_phase=18. So, the start phase of the next bulk is one greater than the end phase of the previous bulk. This difference explains why the inequalities on both sides of the above formula are less than or equal to (as opposed to strictly less than).

The algorithm should generate delete-events for results where:

bulk_start_phase<=min_e<=bulk_end_phase

We want the results for add-events ordered lexicographically by max_s, keys, min_e and we want the results for delete-events ordered lexicographically by min_e, keys, max_s. The table we obtain with this ordering is:

Add/Delete Results Set

| Delete OR Add | Event - Time | max_s | min_e | Stock | Price | Requestor | Subscribe OR un-subscribe |
|---|---|---|---|---|---|---|---|
| Add | 6 | 6 | Infinity | BEA | 65 | Greg | subscribe |
| Add | 7, 11 | 7 | 11 | IBM | 120 | Eric | subscribe |
| Delete* | 11, 7 | 7 | 11 | IBM | 120 | Eric | subscribe |
| Add | 11, 19 | 11 | 19 | IBM | 121 | Eric | subscribe |
| Delete | 11, 5 | 5 | 11 | IBM | 120 | Greg | subscribe |
| Add | 11, 18 | 11 | 18 | IBM | 121 | Greg | subscribe |
| Delete* | 18, 11 | 11 | 18 | IBM | 121 | Greg | subscribe |
| Add | 18, 19 | 18 | 19 | IBM | 121 | Greg | unsubscr. |
| Delete | 19, 11 | 11 | 19 | IBM | 121 | Eric | subscribe |
| Add | 19, 36 | 19 | 36 | IBM | 122 | Eric | subscribe |
| Delete | 19, 18 | 18 | 19 | IBM | 121 | Greg | unsubscr. |
| Add | 19, 26 | 19 | 26 | IBM | 122 | Greg | unsubscr. |
| Delete* | 26, 19 | 19 | 26 | IBM | 122 | Greg | unsubscr. |
| Add | 26, 36 | 26 | 36 | IBM | 122 | Greg | subscribe |
| Delete | 36, 19 | 19 | 36 | IBM | 122 | Eric | subscribe |
| Add | 36, — | 36 | Infinity | IBM | 121 | Eric | subscribe |
| Delete | 36, 26 | 26 | 36 | IBM | 122 | Greg | subscribe |
| Add | 36, — | 36 | Infinity | IBM | 121 | Greg | subscribe |

* indicates that these "deletes" follow "adds" for the same key.

The table with add-events followed by delete-events of the same key combined into "modify" events is given next. For convenience, the key values are presented first.

Add/Delete/Modify Results Set

| Add OR Modify OR Delete | Phase | Stock | Requestor | Price | Subscribe OR unsubscribe |
|---|---|---|---|---|---|
| Add | 6 | BEA | Greg | 65 | subscribe |
| Add | 7 | IBM | Eric | 120 | subscribe |
| Modify | 11 | IBM | Eric | 120,121 | subscribe |
| Modify | 11 | IBM | Greg | 120,121 | subscribe |
| Modify | 18 | IBM | Greg | 121 | subscribe, unsubscribe |
| Modify | 19 | IBM | Eric | 121,122 | subscribe |
| Modify | 19 | IBM | Eric | 121,122 | subscribe |
| Modify | 26 | IBM | Greg | 122 | unsubscribe, subscribe |
| Modify | 36 | IBM | Eric | 122,121 | subscribe |
| Modify | 36 | IBM | Greg | 122,121 | subscribe |

Therefore, the statement that generates both add-events and delete-events is:

SELECT max_s, min_e, keys, - - - FROM T1, T2, ... Tk
  WHERE ( ... )
(max_s<min_e) AND
  (bulk_start_phase<=max_s<=bulk_end_phase)
UNION ALL
SELECT min_e, max_s, keys, - - -, FROM T1, T2, ... Tk
  WHERE ( ... )
(max_s<min_e) AND
  (bulk_start_phase<=min_e<=bulk_end_phase)
ORDER BY 1, (key indices), 2.

Optimization: Expanding Max and Min

Databases have difficulty optimizing maximum and minimum. So, we expand max_s and min_e to get the final formula.

Consider the case where max_s=T1.$s$, i.e., where T2.$s$<=T1.$s$, and T3.$s$<=T1.$s$ and ... and Tk.$s$<=T1.$s$. The condition max_s<min_e then reduces to:

T1.$s$<T2.$e$ and T1.$s$<T3.$e$ and ... and T1.$s$<Tk.$e$. The condition "bulk_start_phase<=max_s <=bulk_end_phase" will then reduce to:

bulk_start_phase<=T1.$s$ and T1.$s$<=bulk_end_phase.

Therefore, for this case the conjunction becomes:

T2.$s$<=T1.$s$ and T3.$s$<=T1.$s$ and ... and Tk.$s$<=T1.$s$
AND
T1.$s$<T2.$e$ and T1.$s$<T3.$e$ and ... and T1.$s$<Tk.$e$
AND
bulk_start_phase<=T1.$s$ and T1.$s$<=bulk_end_phase.

Now consider the SQL phrase after the UNION ALL. Consider in particular the case where min_e=T1.$e$; i.e., T1.$e$<=T2.$e$ and T1.$e$<=T3.$e$ and ... and T1.$e$<=Tk.$e$. In this case the condition max_s<min_e reduces to:

T2.$s$<T1.$e$ and T3.$s$<T1.$e$ and ... and Tk.$s$<T1.$e$

The condition "(bulk_start_phase<=min_e<=bulk_end_phase)" reduces to "bulk_start_phase<=T1.$e$ and T1.$e$<=bulk_end_phase." This gives us the final SQL statement for the bulk detector.

SELECT max_s, min_e, keys, - - - FROM T1, T2, ... Tk
  WHERE ( ... )
//max_s=T1.$s$
T2.$s$<=T1.$s$ and T3.$s$<=T1.$s$ and ... and Tk.$s$<=T1.$s$
AND
T1.$s$<T2.$e$ and T1.$s$<T3.$e$ and ... and T1.$s$<Tk.$e$ AND
bulk_start_phase<=T1.s and T1.s<=bulk_end_phase
OR
//max_s=T2.s
T1.s<=T2.s and T3.s<=T2.s and ... and Tk.s<=T2.s
AND
T2.s<T1.e and T2.s<T3.e and ... and T2.s<Tk.e
AND
bulk_start_phase<=T2.s and T2.s<=bulk_end_phase
OR
... OR
//max_s=Tk.s
T1.s<=Tk.s and T2.s<=Tk.s and ... and T(k−1).s<=Tk.s
AND
Tk.s<T1.e and Tk.s<T2.e and ... and Tk.s<T(k−1).e
AND
bulk_start_phase<=Tk.s and Tk.s<=bulk_end_phase
UNION ALL
SELECT min_e, max_s, keys, - - - , FROM T1, T2, ... Tk WHERE ( ... )
//min_e=T1.e
T1.e<=T2.e and T1.e<=T3.e and ... and T1.e<=Tk.e
AND
T2.s<T1.e and T3.s<T1.e and ... and Tk.s<T1.e
AND
bulk_start_phase<=T1.e and T1.e<=bulk_end_phase
OR
//min_e=T2.e
T2.e<=T1.e and T2.e<=T3.e and ... and T2.e<=Tk.e
AND
T1.s<T2.e and T3.s<T2.e and ... and Tk.s<T2.e
AND
bulk_start_phase<=T2.e and T2.e<=bulk_end_phase
OR
...
OR
//min_e=Tk.e
Tk.e<=T1.e and Tk.e<=T3.e and ... and Tk.e<=T(k−1).e
AND
T1.s<Tk.e and T2.s<Tk.e and ... and T(k−1).s<Tk.e
AND
bulk_start_phase<=Tk.e and Tk.e<=bulk_end_phase
ORDER BY 1, (key columns), 2

It will be readily apparent to those skilled in the art of data software management that there are many applications of the foregoing method and that, for any particular application, modifications and substitutions may be necessary to adapt this method but without departing from the spirit and scope of the present invention, which is defined by the appended claims.

What is claimed is:

1. A method of processing a sequence of data messages, comprising:
   defining a sequence of phases;
   receiving signals representing a sequence of data messages indicating values of a plurality of events;
   assigning each data message in said sequence of data messages to one phase of said sequence of phases;
   storing records each identifying a constant-value sub-sequence of the sequence of phases, during which constant-value sub-sequence a value of each one of one or more of the plurality of events has remained unchanged, and indicating said value of said each one of said one or more of the plurality of events;
   defining a sequence of macro-phases each comprising a different macro-phase sub-sequence of the sequence of phases;
   selecting the values of the events from those records whose constant-value sub-sequences include a first phase of the macro-phase sub-sequence of a macro-phase; and
   outputting signals representing the selected values, exclusive of other said values, as values of the events for the macro-phase.

2. The method as recited in claim 1, wherein:
   assigning comprises
   assigning each data message in said sequence of data messages to one phase in said sequence of phases, at least one data message being assigned to each phase of said sequence of phases;
   identifying one data message from each phase to represent said phase;
   selecting phases of interest; and
   outputting said one data message for each selected phase of interest in said sequence of phases.

3. The method as recited in claim 2, wherein said one data message representing said phase is a last data message in said phase.

4. The method as recited in claim 1, wherein;
   selecting comprises
   identifying one phase from each macro-phase in said sequence of macro-phases to represent said macro-phase, and
   selecting said macro-phases of interest; and
   outputting comprises
   outputting said one phase from each selected macro-phase of interest.

5. The method as recited in claim 1, wherein the macro-phase sub-sequence of each macro-phase has a number of the phases assigned thereto, and wherein said number varies in relation to a speed at which said data messages are being received.

6. The method as recited in claim 2, wherein selecting step includes the step of excluding mutually canceling phases from the selected phases.

7. The method as recited in claim 1, wherein each data message has an identifier, and wherein said storing step includes the step of modifying prior phases from said sequence of phases based on subsequent phases of said sequence of phases, wherein said one data message representing said prior phase has a same said identifier as said one data message representing said subsequent phase.

8. The method as recited in claim 1, wherein:
   receiving comprises
   receiving first sequence of the data messages, and
   receiving a second sequence of the data messages;
   defining a sequence of phases comprises
   defining a first sequence of the phases, and
   defining a second sequence of the phases;
   assigning comprises
   assigning each data message in said first sequence to one phase in said first sequence of phases, at least one data message of said first sequence of messages being assigned to each phase of said first sequence of phases,
   assigning each data message in said second sequence to one phase in said second sequence of phases, at least one data message of said second sequence of messages being assigned to each phase of said second sequence of phases,
   identifying one data message from each phase of said first sequence to represent said each phase of said first sequence of phases,
   identifying one data message from each phase of said second sequence to represent said each phase of said second sequence of phases, selecting phases from said first and second sequence of phases to form a join, and outputting said join.

9. The method of claim 1 wherein:

defining a sequence of macro-phases comprises defining each macro-phase as comprising a macro-phase sub-sequence of a plurality of phases, each macro-phase sub-sequence comprising at least one phase that is different from the phases of the macro-phase sub-sequences of other said macro-phases; and selecting the values of the events comprises selecting the values of the events from those records whose constant-value sub-sequences include a beginning phase of the macro-phase sub-sequence of a macro-phase.

10. The method of claim 1 further comprising:

storing the selected values in a database as the values of the events for the macro-phase or the macro-phase sub-sequence of the macro-phase; and excluding the values of any other phases of said sequence of phases from the values stored in the database for the macro-phase or the macro-phase sub-sequence of the macro-phase.

11. The method of claim 10 further comprising:

at a start of a first macro-phase, deleting from the database the values of the events indicated by the records whose constant-value sub-sequences overlap a start of the macro-phase sub-sequence of a second macro-phase that precedes the first macro-phase in the sequence of phases; and at the start of the first macro-phase, storing in the database the values of the events indicated by the records whose constant-value sub-sequences overlap the start of the macro-phase sub-sequence of the first macro-phase.

12. The method of claim 11 wherein:

the start of the first macro-phase comprises an end of the second macro-phase.

13. The method of claim 11 wherein:

deleting comprises deleting the values of the events indicated by the records whose constant-value sub-sequences start at or before the start of the macro-phase sub-sequence of the second macro-phase and end after the end of the macro-phase sub-sequence of the second macro-phase; and storing comprises storing the values of the events indicated by the records whose constant-value sub-sequences start at or before the start of the macro-phase sub-sequence of the first macro-phase and end after the end of the macro-phase sub-sequence of the first macro-phase.

14. The method of claim 10 further comprising:

determining the values of the events indicated by the records whose constant-value sub-sequences overlap a start of the macro-phase sub-sequences of a first macro-phase and of a previous macro-phase that immediately precedes the first macro-phase;

deleting from the database the values of the events indicated by the records the start of whose constant-value sub-sequences precede the start of the macro-phase sub-sequence of the previous macro-phase; and storing in the database the values of the events indicated by the records the start of whose constant-value sub-sequences succeed the start of the macro-phase sub-sequence of the first macro-phase.

15. The method of claim 10 further comprising:

during a first macro-phase, storing in the database the values of events indicated by the records whose constant-value sub-sequences start during the macro-phase; and during the first macro-phase, deleting from the database the values of events indicated by the records whose constant-value sub-sequences end during the macro-phase.

16. The method of claim 1 wherein:

selecting the values of the events comprises selecting the values for an individual macro-phase by deleting, from the values of events selected for a second macro-phase that precedes the individual macro-phase, the values of the events from the records whose constant-value sub-sequences include the start of the macro-phase sub-sequence of the second macro-phase, and adding, to the values of events selected for the second macro-phase, the values of the events from the records whose constant-value sub-sequences include the start of the macro-phase sub-sequence of the individual macro-phase.

17. The method of claim 16 further comprising:

storing the selected values for the second macro-phase in a database as the values of the events for the second macro-phase or the macro-phase sub-sequence of the second macro-phase;

excluding the values of any other phases of said sequence of phases from the values stored in the database for the second macro-phase or the macro-phase sub-sequence of the second macro-phase;

storing the selected values for the individual macro-phase in the database as the values of the events for the individual macro-phase or the macro-phase sub-sequence of the individual macro-phase; and excluding the values of any other phases from the values stored in the database for the individual macro-phase or the macro-phase sub-sequence of the individual macro-phase.

18. The method of claim 1 wherein:

storing records comprises storing records each identifying a constant-value sub-sequence of the sequence of phases, during which constant value sub-sequence a value of one of the plurality of events has remained unchanged, and indicating said value of said one event; and storing said records for each event of the plurality of events.

19. The method of claim 18 wherein:

storing said records for each event comprises storing one of said records for each change in the value of the event indicated by received said data messages.

20. The method of claim 1 wherein:

storing records comprises storing records each identifying a constant-value sub-sequence of the sequence of phases during which constant-value sub-sequence values of a multiplicity of events of the plurality of events have remained unchanged, and indicating said values of said multiplicity of events; and storing at least one said record for each change in the value of an event indicated by received said data messages.

21. The method of claim 20 wherein:

the multiplicity of events comprises all of the plurality of events; and storing at least one said record comprises storing one said record for each said change.

* * * * *